US012570924B2

(12) United States Patent
Strum

(10) Patent No.: US 12,570,924 B2
(45) Date of Patent: Mar. 10, 2026

(54) CONTACT LENS CLEANING AGENT

(71) Applicant: Albert Sturm, Cologne (DE)

(72) Inventor: Albert Strum, Cologne (DE)

(73) Assignee: Albert Strum, Cologne (DE)

( * ) Notice: Subject to any disclaimer, the term of this patent is extended or adjusted under 35 U.S.C. 154(b) by 0 days.

(21) Appl. No.: 16/478,933

(22) PCT Filed: Jan. 22, 2018

(86) PCT No.: PCT/EP2018/051449
§ 371 (c)(1),
(2) Date: Jul. 18, 2019

(87) PCT Pub. No.: WO2018/134404
PCT Pub. Date: Jul. 26, 2018

(65) Prior Publication Data

US 2019/0382685 A1 Dec. 19, 2019

(30) Foreign Application Priority Data

Jan. 20, 2017 (EP) .................................... 17152424

(51) Int. Cl.
*C11D 3/00* (2006.01)
*C11D 3/386* (2006.01)

(52) U.S. Cl.
CPC ........ *C11D 3/0078* (2013.01); *C11D 3/38627* (2013.01); *C11D 3/38636* (2013.01)

(58) Field of Classification Search
CPC .............. C11D 3/0078; C11D 3/38627; C11D 3/38636; C12Y 301/01003
See application file for complete search history.

(56) References Cited

U.S. PATENT DOCUMENTS

| | | | | |
|---|---|---|---|---|
| 6,180,393 | B1 | 1/2001 | Strum | |
| 2010/0204079 | A1 * | 8/2010 | McAuliffe | ......... C11D 3/38636 510/320 |
| 2013/0252287 | A1 | 9/2013 | Goldfeld et al. | |

FOREIGN PATENT DOCUMENTS

| | | | | |
|---|---|---|---|---|
| CN | 1452654 | A | 10/2003 | |
| CN | 1308496 | C | 4/2007 | |
| CN | 101952437 | A | 1/2011 | |
| EP | 0279401 | A2 | 8/1988 | |
| EP | 0385401 | A1 * | 9/1990 | ............. C12N 15/55 |
| EP | 0456467 | A2 | 11/1991 | |
| WO | 79-00963 | A1 | 11/1979 | |
| WO | 86-04083 | A1 | 7/1986 | |
| WO | 98-37921 | A2 | 9/1998 | |
| WO | 01-54834 | A1 | 8/2001 | |
| WO | 03-013621 | A1 | 2/2003 | |

OTHER PUBLICATIONS

Guo, J. et al. 2015. A convenient test for lipase activity in aqueous-based solutions. Enzyme and Microbial Technology. 71: 8-12. (Year: 2015).*
International Search Report for Application No. PCT/EP2018/051449 dated Mar. 8, 2018.
International Preliminary Report from the corresponding PCT International Application No. PCT/EP2018/051449 mailed May 14, 2019.
Search Report from co-pending Chinese Patent Application No. 2018800076469 dated Jun. 2, 2020.
Office Action from co-pending Chinese Patent Application No. 2018800076469 dated May 6, 2021. The search report on p. 2 uses internationally recognized symbols from PCT practice to identify relevance to particular claims for each reference.

* cited by examiner

*Primary Examiner* — Lynn Y Fan
(74) *Attorney, Agent, or Firm* — Christensen, Fonder, Dardi PLLC; Peter S. Dardi

(57) ABSTRACT

The invention relates to a lipase-containing composition for cleaning contact lenses, in particular soft contact lenses, characterized in that the composition contains a lipase that is obtainable from the yeast *Candida rugose*.

16 Claims, 7 Drawing Sheets

Figure 3A:
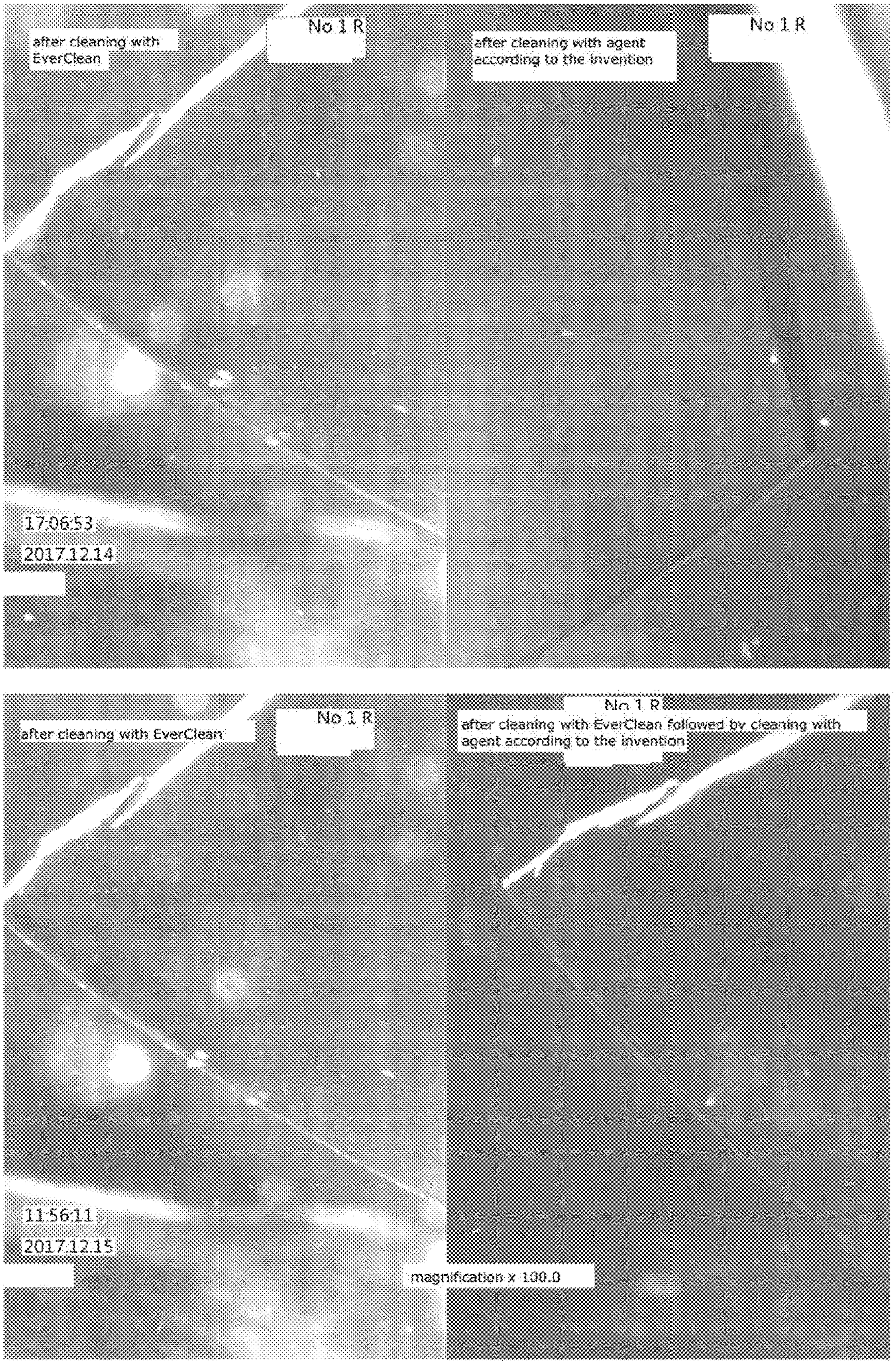

Figure 3A: Biofinity/Cooper Vision/Comfilcon A, worn for 1 month
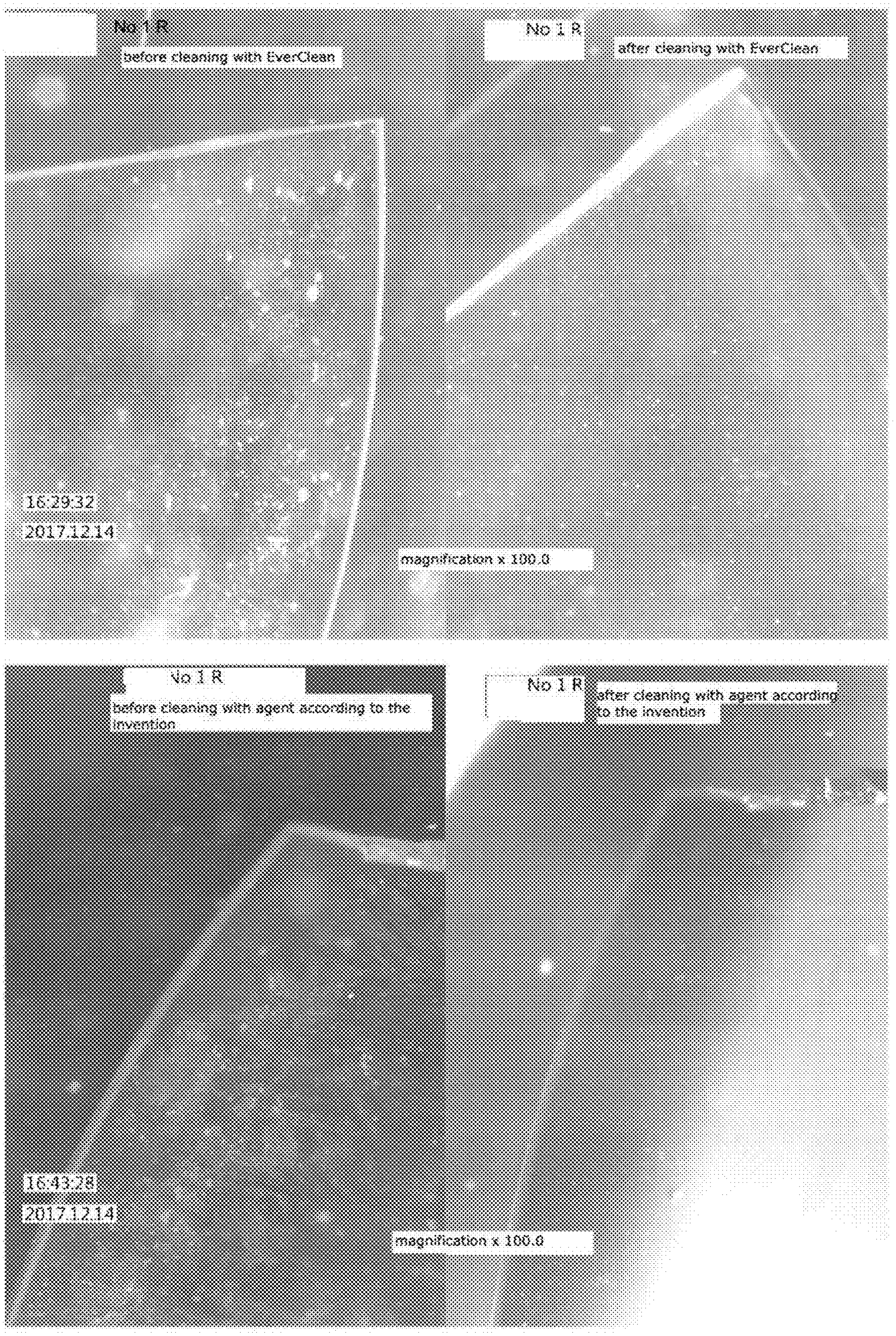

Figure 3B:
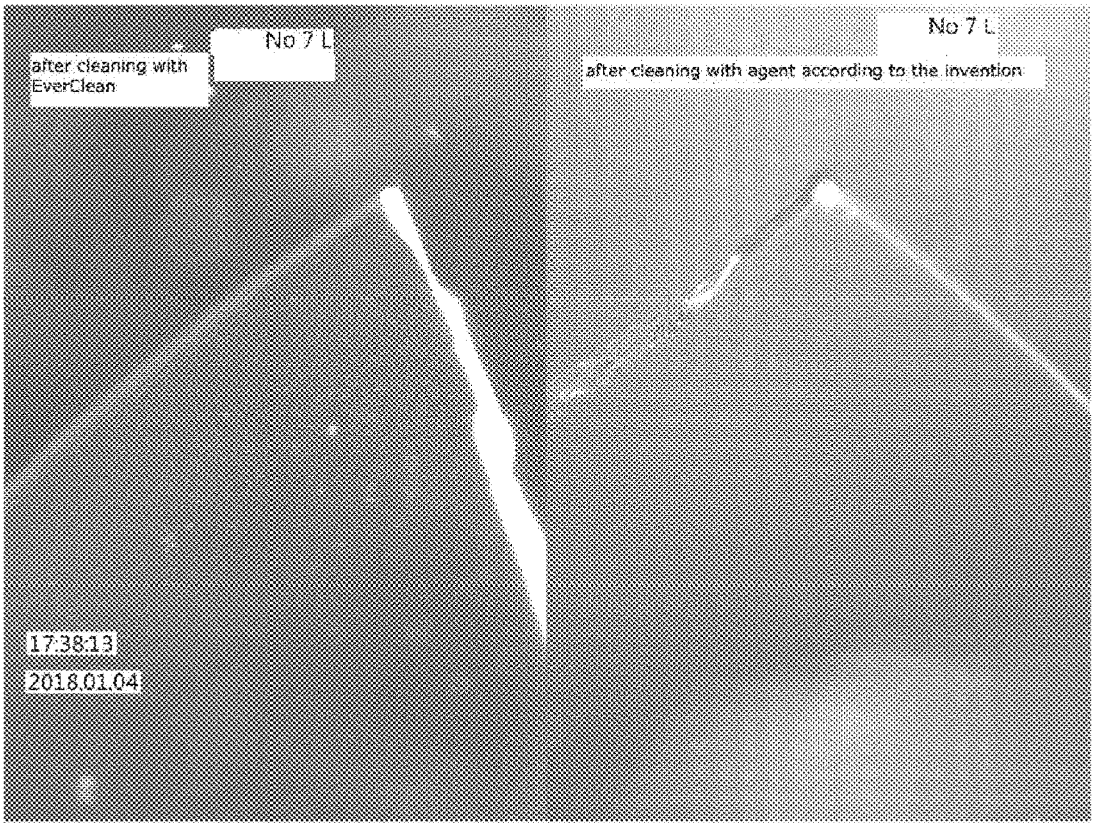
Figure 3B:
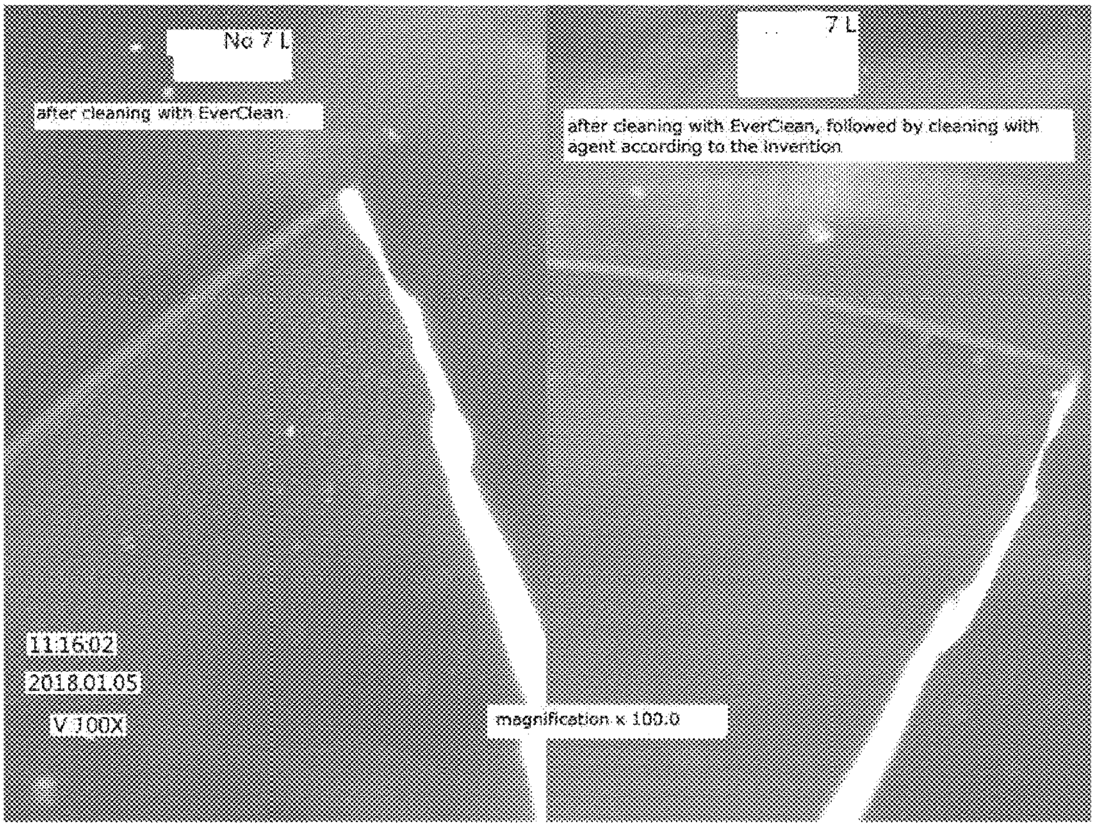

Figure 3B: Rios No. 7, Biofinity/Cooper Vision/Comfilcon A, worn for 1 month
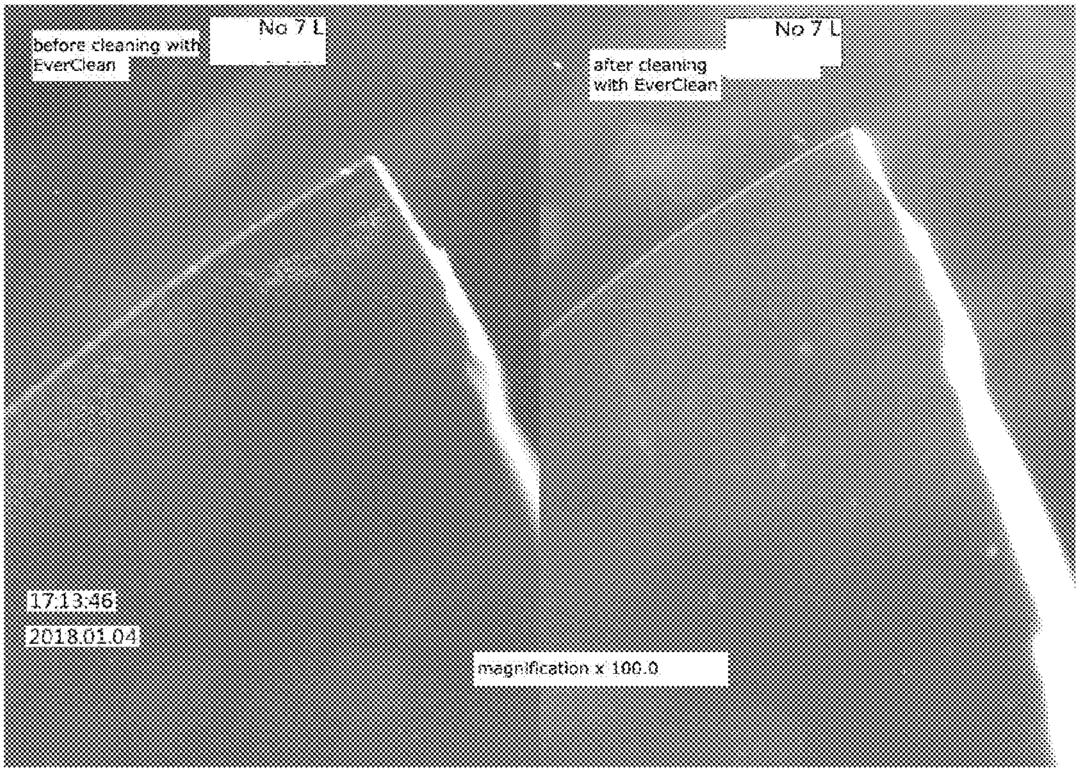
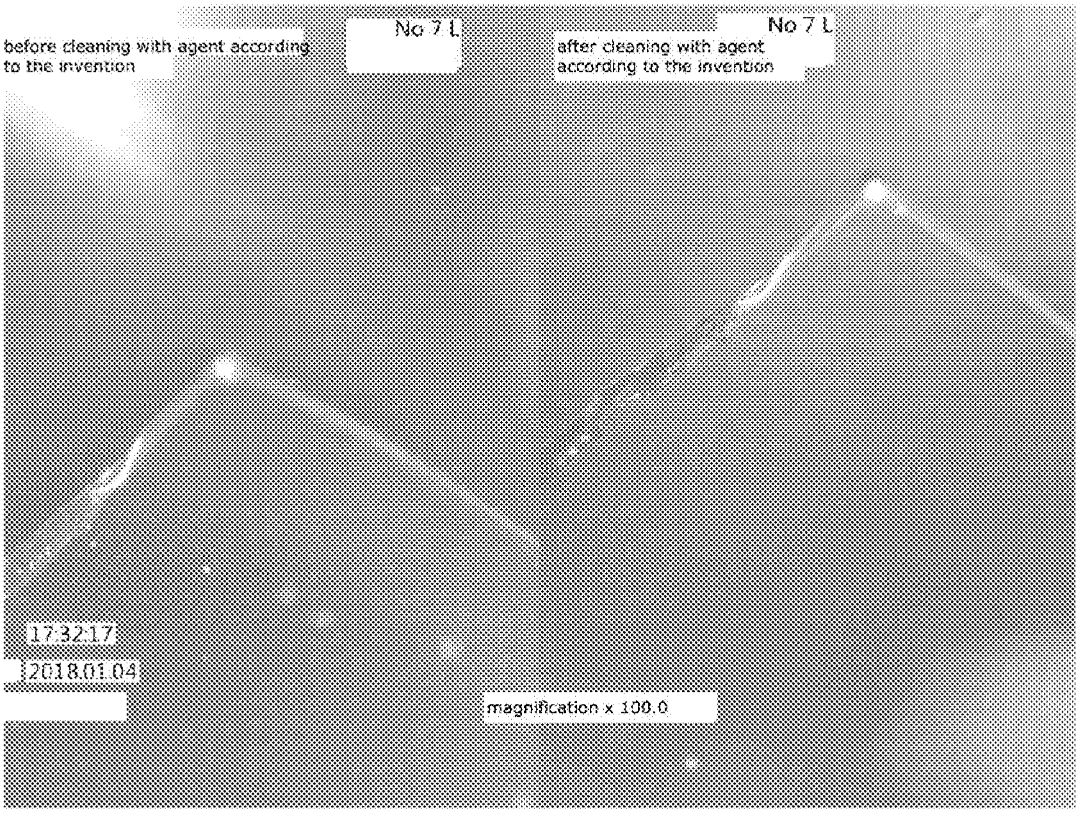

Figure 3C:
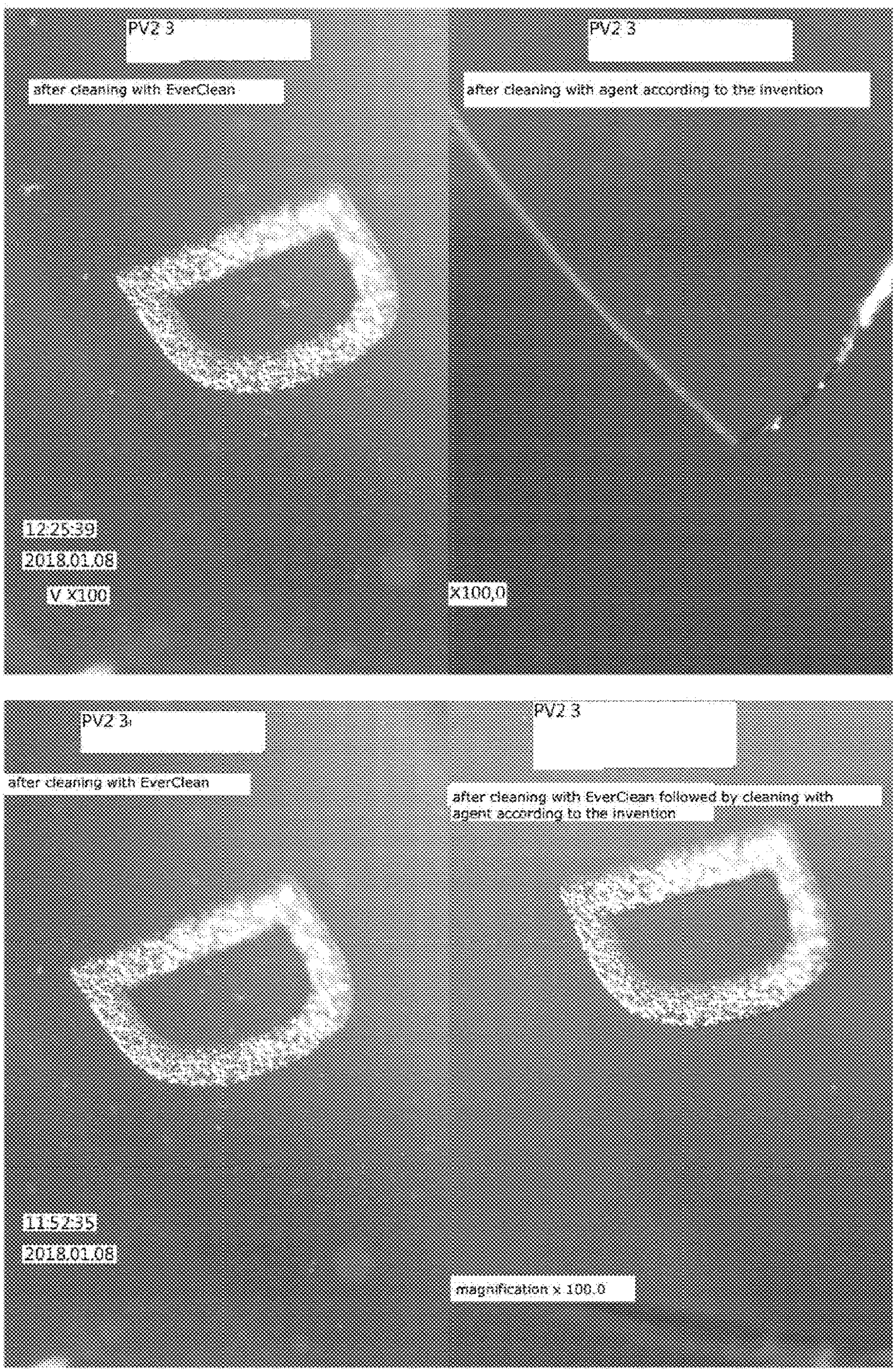

Figure 3C: Pure Vision HD2/Bausch & Lomb, Balafilcon A, permanent for 3 days
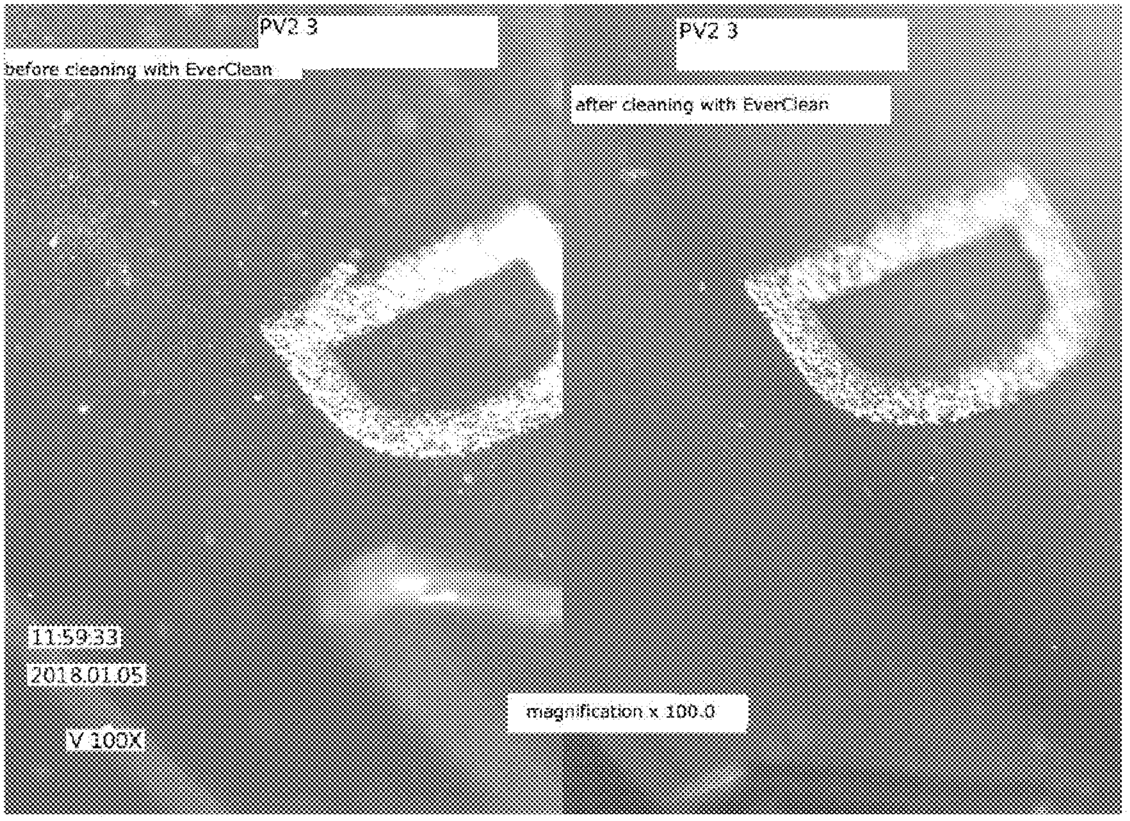
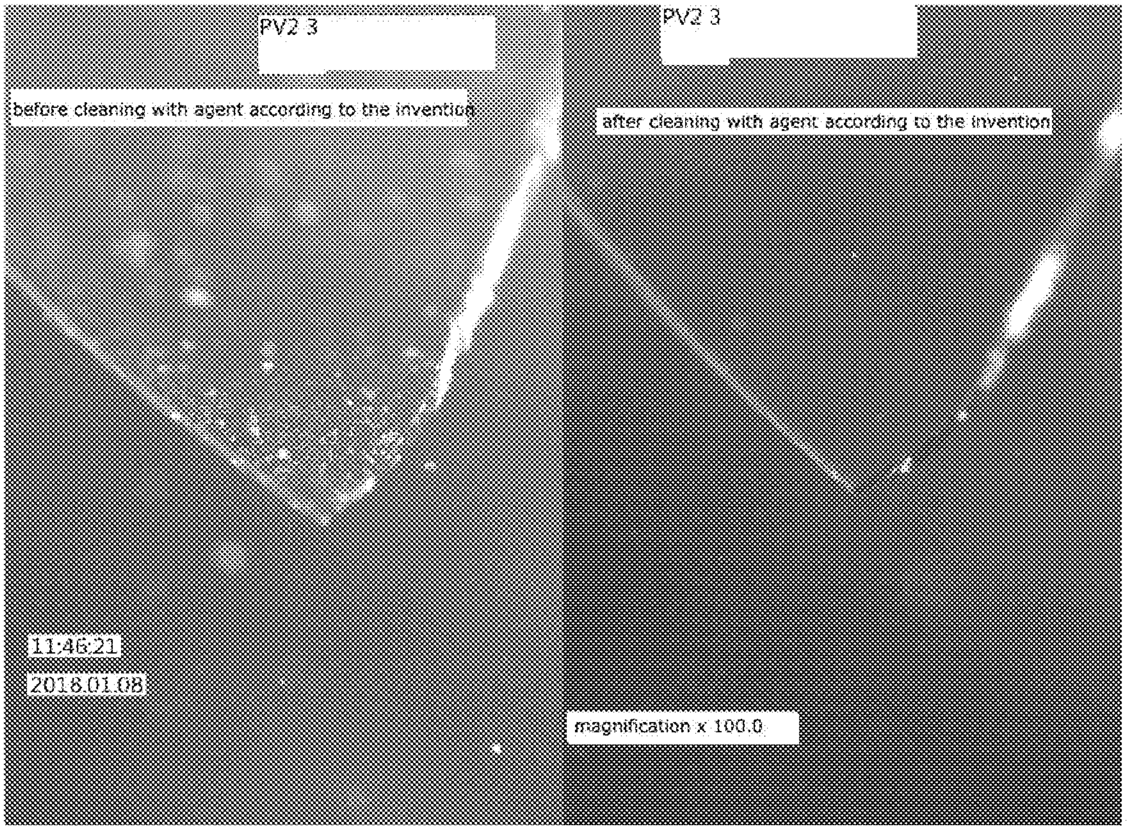

CONTACT LENS CLEANING AGENT

This application is a national stage application of PCT application PCT/EP2018/051449 to Sturm filed on Jan. 22, 2018, which claims priority to EP Application Serial No. 17152424.1 filed on Jan. 20, 2017, both of which are incorporated herein by reference.

The present invention relates to the use of a lipase-containing composition for cleaning soft contact lenses, to a water-soluble solid contact lens cleaning agent, and to the use of a lipase as a means for removing metabolic deposits on or in a soft contact lens, or for supporting the cleaning of the soft contact lens in a water-soluble solid contact lens cleaning agent.

Contact lenses are still very popular among persons having a defective vision. A problem in the use of contact lenses is still the appropriate care. A wide variety of different systems are known that essentially have the fact in common that a disinfection, mostly over night, of the contact lens is effected after the contact lens has been worn, wherein the disinfection is caused by chemical agents, which must be neutralized because of their aggressive properties before the contact lens can be worn again. For this purpose, a wide variety of caring agents has become established on the market, such as an aqueous hydrogen peroxide solution as a disinfectant solution that is neutralized or decomposed by subsequent stages. For this, different systems are known in the prior art, such as catalytic decomposition on surfaces of precious metals, enzymatic decomposition by means of catalase, for example, and chemical neutralization by reducing the hydrogen peroxide with sodium thiosulfate. Also, the problem of removing metabolic deposits, especially protein deposits, on the lenses or in the lens material is basically solved in the prior art. For example, protease-containing agents are added in a previous cleaning stage. As a protease that removes protein deposits in the contact lens matrices if soft contact lenses are concerned, subtilisin may be mentioned, in particular. EP 0 219 220 A may serve as a representative of the prior art. It describes a combined contact lens care agent that both disinfects and cleans the contact lenses. The disinfection is effected by means of a solution of hydrogen peroxide and a protease that is active in a peroxide-containing solution. Subtilisin is mentioned as a corresponding protease.

The removal of metabolic deposits, especially protein deposits, on or in the contact lens matrix is extremely important, because such deposits lead to alterations of the lens matrix, ranging from changes of the optical properties to the provocation of inflammations.

Although different systems are already available on the market, the care of soft contact lenses seems to be so complicated that one has proceeded to sell so-called disposable contact lenses.

In this case, the cleaning and disinfection is no longer in the focus, since the contact lenses are simply thrown away after some wearing time. On the other hand, however, only prefabricated mass products can be offered as a consequence, because the individual tailoring of the contact lens involves too high costs, so that an individually adapted disposable lens is not reasonable economically. However, when individual adaptations are dispensed with, contact lenses having suboptimal properties are given to the respective patients.

EP 009 374 already describes tablets for the cleaning of contact lenses, containing trypsin, alpha-amylase, and a lipase.

WO 98/37921 A1 relates to a contact lens care agent that contains the protease subtilisin in addition to a peroxide-degrading enzyme, such as catalase, and releases these enzymes in an aqueous solution for the cleaning of contact lenses. These systems are advantageous since the proteases need not be employed in a separate cleaning stage before the disinfection.

WO 03/013621 A describes systems for the cleaning of contact lenses, which systems may contain proteases, lipases and amylases.

WO 01/54834 A1, EP 0 456 467 A2 and WO 86/04083 A1 disclose the use of pancreatin, which is a multi-enzyme complex and has proteolytic, lipolytic and amylolytic activities.

EP 0 279 401 A2 discloses the use of pancreatic lipase as well as microbiological lipases for removing deposits in contact lenses.

WO 97/00963 A1 discloses the use of lipolytic enzymes for cleaving lipids into fatty acids and alcohols.

Deposits cannot be removed satisfactorily using conventional contact lens care agents of the prior art.

In particular, cholesterol deposits have shown to be resilient.

Thus, one object of the invention is to provide a contact lens care agent that avoids the above described problems. In particular, it is desirable to reduce or essentially remove cholesterol deposits in soft contact lenses.

The present invention is based on the surprising recognition that the use of a lipase that is obtainable from *Candida rugosa* leads to the removal of deposits, especially cholesterol-containing deposits, that cannot be removed satisfactorily with conventional contact lens care agents.

Thus, the present invention relates to a lipase-containing composition for cleaning contact lenses, especially soft contact lenses, characterized in that the composition contains a lipase that is obtainable from the yeast *Candida rugosa*. This lipase is also referred to as a pancreatic lipase.

Lipase is an enzyme that cleaves lipids (triglycerides). In addition, lipase is responsible for the hydrolysis of retinyl esters into retinol and fatty acids.

Surprisingly, it has been found that the lipase contained in the composition according to the invention may also be used to remove cholesterol-containing deposits in soft hydrophilic contact lenses, although cholesterol is not a triglyceride and does not have any structural element that is usually attacked by lipases, either.

One embodiment of the invention is characterized in that said lipase is the lipase having the Enzyme Commission No. 3.1.1.3.

Another embodiment of the invention is characterized in that said contact lenses are soft contact lenses.

The lipase employed in the composition according to the invention leads to a reduction of cholesterol-containing deposits on and in contact lenses, up to the complete removal of the cholesterol-containing deposits.

Figure 1:
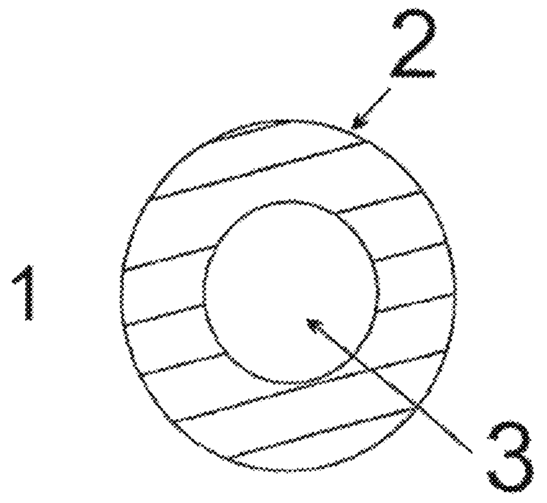

FIG. 1 schematically shows a contact lens care agent according to the invention.

Figure 2B:
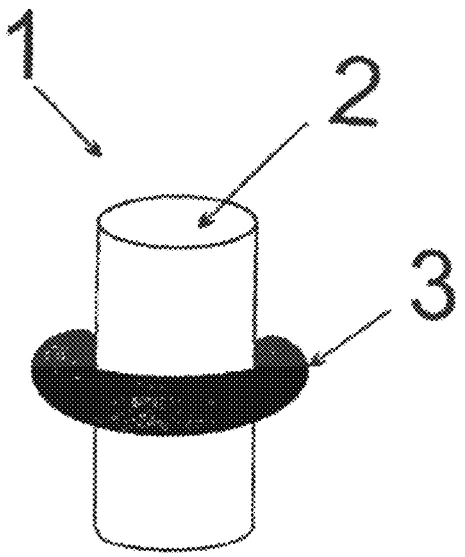
Figure 2A:
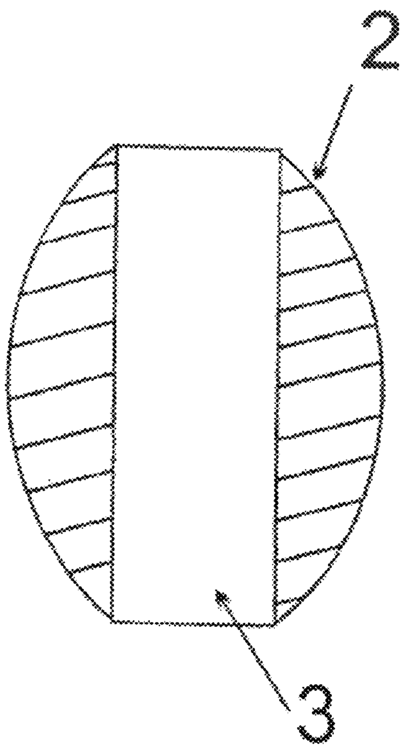

FIGS. 2A and 2B schematically show other embodiments of the contact lens care agent according to the invention.

FIGS. 3A to C show results of the treatment of contact lenses polluted with cholesterol deposits using the contact lens care agent according to the invention as compared to a commercially available contact lens care agent (Ever-Clean®, Avizor, Spain), which does not contain a lipase according to the composition of the invention.

The use of the composition is performed simply by having it act in an aqueous solution on the contact lenses to be cleaned. The aqueous solution is advantageously buffered in order to support the activity of the lipase. The ionic strength of the solution can be adjusted by the buffer salts or other components contained therein in such a way, in particular, that the activity of the lipase is not adversely affected, but advantageously optimized.

The buffer salts for adjusting a pH value favorable for the activity of the lipase may be in an aqueous phase, to which the composition to be used according to the invention is added. The same applies to the components adjusting the ionic strength, unless the ingredients buffering the pH value already adjust a suitable ionic strength.

If the composition to be used according to the invention is itself in an aqueous phase, it can be added to the contact lens to be cleaned, which is usually present in media that are essentially physiological and correspond to the environment of the tear fluid.

The composition according to the invention may also be in a solid form, such as in tablet form. The lipase is galenically formulated in a way familiar to those skilled in the art. For example, the lipase may be formulated in physiologically safe solids employed for the formulation of freeze-dried proteins, especially in water-soluble sugars, for example, in tablet form. The tablet matrix may also contain substances that may serve for adjusting the pH value and the ionic strength. In one embodiment of the composition according to the invention, especially in tablet form, it contains the components catalase, sodium chloride, buffering salts and formulation adjuvants that are familiar to those skilled in the relevant art, such as pelletizing agents. In addition to the lipase that is essential in the composition according to the invention, other enzymes, for example, proteases, such as subtilisin, or amylases, may also be contained in the composition. This applies to both liquid and solid formulations of the composition according to the invention.

The lipase is typically present in an amount of from 0.1 mg to 1.5 mg per tablet, especially 0.4 mg per tablet. The catalase may typically be present in an amount of from 0.02 mg to 2 mg per tablet. Subtilisin may be present in an amount of from 0.05 mg to 5 mg per tablet.

A lipase that is suitable for the composition according to the invention is commercially available, for example, under the designation of AY30, CAS No. 9001-62-1, Acros Organic.

The tablet described in WO 98/37921 A1 is particularly suitable for the formulation of the composition according to the invention.

Therefore, the invention also relates to a water-soluble solid contact lens care agent 1 with at least one first 2 and one second compartment 3, containing at least one agent for removing or supporting the cleaning of cholesterol-containing metabolic deposits on a contact lens in the first compartment 2, and at least one agent that can neutralize a contact lens disinfection solution in the second compartment 3, in which the first compartment 2 is dissolved more quickly in the contact lens disinfection solution as compared to the second compartment 3, wherein both compartments 2, 3 can be exposed to said contact lens disinfection solution at the same time. The contact lens care agent is characterized in that said agent for removing or supporting the cleaning of cholesterol-containing metabolic deposits on a contact lens is a lipase, especially the lipase with the Enzyme Commission No. 3.1.1.3, obtainable from *Candida rugosa.*

According to the invention, a contact lens care agent that is characterized by having two compartments 2, 3 is preferable.

In still another embodiment of the invention, the contact lens care agent is characterized in that said first compartment 2 concentrically encloses said second compartment 3. FIG. 1 schematically shows a cross-sectional view through a contact lens care agent according to the invention.

In another embodiment of the invention, the contact lens care agent is characterized in that said first compartment 2 does not enclose said second compartment 3 from all sides (FIG. 2A).

In another embodiment of the invention, the contact lens care agent is characterized in that said contact lens care agent is a molded product with two mutually perpendicular axes, wherein said first compartment 2 is provided around the first axis, and said second compartment 3 is provided around the second axis (FIG. 2B).

In still another embodiment of the invention, the contact lens care agent is characterized in that said first compartment 2 contains a protease in addition to said lipase.

The present invention also relates to the use of a lipase obtainable from Candida rugosa as an agent for removing or supporting the cleaning of cholesterol-containing metabolic deposits on a contact lens in a water-soluble solid contact lens care agent 1 with at least one first 2 and one second compartment 3, comprising at least one agent for removing or supporting the cleaning of cholesterol-containing metabolic deposits on a contact lens in the first compartment 2, and at least one agent that can neutralize a contact lens disinfection solution in the second compartment 3, in which the first compartment 2 is dissolved more quickly in the contact lens disinfection solution as compared to the second compartment 3, wherein both compartments 2, 3 can be exposed to said contact lens disinfection solution at the same time.

One embodiment of the use according to the invention is characterized in that two compartments 2, 3 are present in the contact lens care agent.

Another embodiment of the use according to the invention is characterized in that said first compartment 2 of the contact lens care agent does not enclose said second compartment 3 of the contact lens care agent from all sides.

Another embodiment of the use according to the invention is characterized in that said first compartment 2 of the contact lens care agent concentrically encloses said second compartment 3 of the contact lens care agent.

Yet another embodiment of the use according to the invention is characterized in that said contact lens care agent is a molded product with two mutually perpendicular axes, wherein said first compartment 2 of the contact lens care agent is provided around the first axis, and said second compartment 3 of the contact lens care agent is provided around the second axis.

The cleaning of contact lenses is performed in a way analogous to that already known to the user from the use of conventional cleaning agents.

The application of the composition to be used according to the invention is auto-active.

All cited documents are included in this disclosure by reference in their entirety, unless such disclosure is in contradiction to the teaching of the invention.

The invention will be further illustrated by means of the following Example.

EXAMPLE

A composition according to the invention in tablet form comprising 0.4 mg of lipase (AY30, CAS No. 9001-62-1, Acros Organic, Thermo Fisher Scientific, Geel, Belgium) in addition to subtilisin was tested in comparison with a per se known composition with no lipase (EverClean, manufacturer: Avizor (Madrid, Spain)), but otherwise the same components, for its ability to achieve an increased cleaning performance over the known composition with no lipase.

For comparison, soft, worn and uncleaned silicone hydrogel monthly disposable lenses (Biofinity/Cooper Vision/Comfilcon A and Pure Vision HD2/Bausch & Lomb/Balafilcon A) before and after the cleaning with EverClean and the composition according to the invention.

The Biofinity/Comfilcon A contact lenses (No. 1, FIG. 3A, and No. 7, FIG. 3B) were worn for 30 days and cleaned with EverClean (commercially available combination solution).

The Pure Vision HD2/Balafilcon A contact lens was permanently worn for 3 days, and not cleaned during this phase (FIG. 3C).

Comparison of the cleaning performance of EverClean and EverClean plus the composition according to the invention on the basis of the amount of residues on the same contact lens, which is parted in the middle for this purpose, and both halves are respectively analyzed microscopically before and after the treatment, and digitally documented.

Comparison of the amount of residues on the contact lens surface after treatment with EverClean and an additional treatment with the composition according to the invention:

1. The test lenses were parted in the middle in order to ensure the same conditions for both cleaning systems. Before the cleaning, both halves were examined microscopically in a digital microscope at a magnification of M=100 (100× magnification), and documented. One half was treated with EverClean over night, while the other half was at the same time treated with the composition according to the invention. Additional cleaning steps were not performed.
2. After the respective cleaning, both halves were again examined in the same microscope at the same magnification, and documented. The surface residues of both halves were subjected to a direct comparison, and also documented.
3. The half treated with EverClean was again treated, this time with the composition according to the invention. Here too, the cleaning result was microscopically documented, and documented in direct comparison with the initial situation.

The test results show that both products that were used not only clean contact lenses, but are able to regenerate them, wherein the cleaning power of the composition according to the invention exceeds that of EverClean.

This can be attributed to the additional component of the tablet. The use of the composition according to the invention also removes cholesterol deposits, in addition to the proteins that deposit from metabolism during the wearing from the tear environment on the contact lens surface up to the matrix thereof.

A further stage neutralizes the 3% peroxide in the carrier solution used for disinfection, to form saline. A last stage usually involves an indicator, which colors the carrier fluid yellow for safety after the neutralization process has taken place.

The cleaning time is 2 hours and is auto-active, so that additional cleaning and manual handling, which can adversely affect the contact lens surface, can be avoided.

The integrity and daily cleaning and regeneration of the contact lens surface preserves the health of the anterior eye segment, being important criteria in the contact lens follow-up care.

In all experimental runs, an improvement of the cleaning performance of the composition according to the invention could be found in direct comparison with EverClean.

Professional adaptations should use the care system that achieves the best cleaning results and ensures the health of the anterior eye segment.

This requirement becomes particularly relevant in the case where contact lenses are worn longer than recommended, or permanently over several nights, which is rather common than an exception in the practice of the wearers of replacement systems.

The invention claimed is:

1. A water-soluble solid contact lens care agent with at least one first compartment and one second compartment, comprising at least one water-soluble agent for removing or supporting the cleaning of cholesterol-containing metabolic deposits on a contact lens in the first compartment, and at least one agent in the second compartment that can neutralize a contact lens disinfection solution, wherein the first compartment is dissolved more quickly in the contact lens disinfection solution as compared to the second compartment when the first compartment and the second compartment are exposed to said contact lens disinfection solution at the same time and wherein said water-soluble agent for removing or supporting the cleaning of cholesterol-containing metabolic deposits on a contact lens is a lipase with the Enzyme Commission No. 3.1.1.3 in an amount from 0.1 mg to 1.5 mg.

2. The water-soluble solid contact lens care agent according to claim 1, wherein two compartments are present.

3. The water-soluble solid contact lens care agent according to claim 1, wherein said first compartment does not enclose said second compartment from all sides.

4. The water-soluble solid contact lens care agent according to claim 3, wherein said first compartment concentrically encloses said second compartment.

5. The water-soluble solid contact lens care agent according to claim 3 wherein said contact lens care agent is a molded product with two mutually perpendicular axes, wherein said first compartment is provided around the first axis, and said second compartment is provided around the second axis.

6. The water-soluble solid contact lens care agent according to claim 1 wherein said first compartment contains a protease in addition to said lipase.

7. A method of using a lipase with the Enzyme Commission No. 3.1.1.3 as an agent for removing or supporting the cleaning of cholesterol-containing metabolic deposits on a contact lens in a water-soluble solid contact lens care agent with at least one first and one second compartment, comprising at least one agent for removing or supporting the cleaning of cholesterol-containing metabolic deposits on a contact lens in the first compartment, and at least one agent that can neutralize a contact lens disinfection solution in the second compartment, in which the first compartment is dissolved more quickly in the contact lens disinfection solution as compared to the second compartment, wherein both compartments can be exposed to said contact lens disinfection solution at the same time, comprising the step of combing the contact lens care agent with water and a contact lens.

8. The method according to claim 7, wherein two compartments are present in said contact lens care agent.

9. The method according to claim 7 wherein said first compartment of the contact lens care agent does not enclose said second compartment of the contact lens care agent from all sides.

10. The method according to claim 7, wherein said first compartment of the contact lens care agent concentrically encloses said second compartment of the contact lens care agent.

11. The method according to claim 9 wherein said contact lens care agent is a molded product with two mutually perpendicular axes, wherein said first compartment of the contact lens care agent is provided around the first axis, and said second compartment of the contact lens care agent is provided around the second axis.

12. The water-soluble solid contact lens care agent of claim 1 wherein the lipase is obtainable from *Candida rugosa.*

13. The method of claim 7 wherein the lipase is obtainable from *Candida rugosa.*

14. The water-soluble solid contact lens care agent of claim 1, wherein the lipase is present in an amount of 0.4 mg.

15. The water-soluble solid contact lens care agent of claim 1, wherein catalase is present in an amount of from 0.02 mg to 2 mg within the second compartment and wherein the contact lens disinfection solution comprises aqueous hydrogen peroxide.

16. The water-soluble solid contact lens care agent of claim 1, wherein subtilisin is present in an amount of from 0.05 mg to 5 mg within the first compartment.

* * * * *